Aug. 24, 1926.

G. A. MADDOX 1,597,238

CONTAINER CLOSURE AND CAP REMOVER

Filed April 20, 1925

INVENTOR
Gustavus A. Maddox
BY
William W. Varney
ATTORNEY

Patented Aug. 24, 1926.

1,597,238

UNITED STATES PATENT OFFICE.

GUSTAVUS A. MADDOX, OF BALTIMORE, MARYLAND.

CONTAINER CLOSURE AND CAP REMOVER.

Application filed April 20, 1925. Serial No. 24,512.

The object of my invention is the providing an improved container closure having means for maintaining the same in position and so constructed that the same may be used in a partially open position, as desired.

A further object of my invention is the providing a simple container closure which may be snapped on in a motion normal to the closure, or may be slid on in a motion parallel to the closure, as desired.

A further object of my invention is the providing in a container closure means for partially sliding the same out of the way so that the contents of the container may be poured out without entirely removing the closure, or cap.

A further object of my invention is the providing a container closure having a stop acting the double purpose of limiting the movement of the closure in one direction of its sliding action at the same time having an attached cap remover.

With the foregoing and other objects in view, my invention consists of the novel construction, combination and arrangement of parts as hereinafter specifically described and illustrated in the accompanying drawings, wherein is shown the preferred embodiment of my invention, but it is understood that changes, variations and modifications can be resorted to which come within the scope of the claims hereunto appended.

Figure 1:
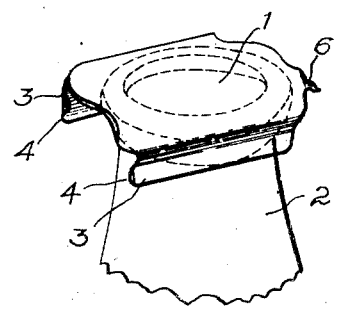
Figure 2:
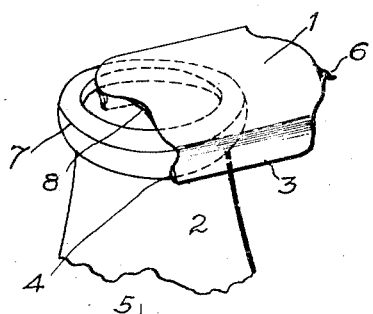
Figures 3, 5:
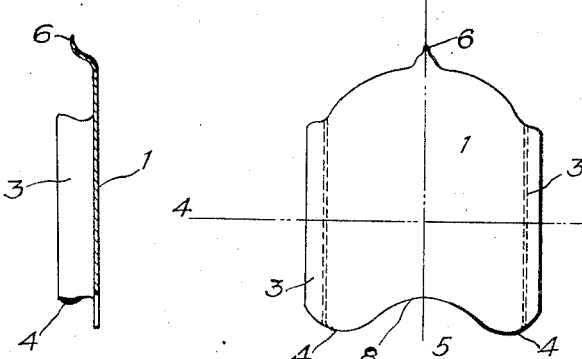
Figure 4:
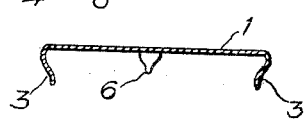

In the drawing of the herein-described embodiment of my invention, Fig. 1 shows my container on a milk bottle in closed position; Fig. 2 shows my container on a milk bottle in partially open position, permitting the contents to be poured out of the bottle; Fig. 3 is a plan view, or view looking directly down on my closure, or cap; Fig. 4 is a sectional view taken through the closure on the lines 4—4 of Fig. 3; Fig. 5 is a sectional view taken through my closure on lines 5—5 of Fig. 3.

Similar numerals refer to similar parts throughout the several views.

1 is the top of the closure, and may consist of sheet metal, papier mâché, or other suitable material, preferably of such resilient quality that the clamps may have a resilient, or spring, movement. 2 is a bottle, as shown in the drawing, a milk bottle, which is to be closed by my closure. 3 are securing clamps, one on each side of the top 1. 4 are stops. I have shown one on the end of each of the clamps, although one stop on one clamp will be effective. 6 is a means for preventing an excessive movement of the top in one direction opposite from the movement prevented by stops 4; said means 6 I have shown as a depending member formed as a cap opener. 7 is a bead formed at the mouth of the container, such as is usual in milk bottles. 8 is the concave portion of the cap.

The operation of my invention is as follows:

The closure, as suggested above, being constructed of a resilient, or spring-like, material may be snapped on vertically the clamps yielding to permit the same to spring over the bead 7 of bottle 2, or it may be slid on substantially in the plane of the container opening, the stops 4 yielding to permit the same; some considerable pressure is required to slide it on in this way to overcome the resistance of stops 4. When the closure of the cap is in the position shown in Fig. 2, or in partially open position, the concave portion 8 permits the liquid to flow out of the container.

The removal of the closure is in the reverse of that of putting the same on, that is, it can be pulled off vertically or along the axis of the bottle, or may be slid off horizontally or transverse to the axis of the bottle.

Having thus described my invention, what I claim and desire to secure by Letters Patent is:

1. A closure for vessels comprising a top provided with depending securing clamps to clamp over a projection on a vessel to be closed, a stop at the end of one of said clamps to limit the sliding movement thereof except to detach the same from the receptacle.

2. A closure for vessels comprising a flat top provided with parallel depending securing clamps, a stop at the end of one of said clamps to limit the sliding movement thereof except to detach the same from a receptacle.

3. A closure for vessels comprising a flat top provided with parallel depending securing clamps, a stop at the end of one of said clamps to limit the sliding movement thereof except to detach the same from a receptacle. and means for preventing the excessive sliding movement of said clamp in an opposite direction.

4. A closure for vessels comprising a top having a concave recess in the edge of one end thereof and provided with parallel depending securing clamps on the sides thereof, a stop at the end of one of the said clamps to limit the sliding movement thereof except to detach the same from a receptacle.

5. A closure for vessels comprising a top having a concave recess in the edge of one end thereof and provided with parallel depending securing clamps on the sides thereof, a stop at the end of one of the said clamps to limit the sliding movement thereof except to detach the same from a receptacle, and means to prevent the excessive sliding movement of said clamp in an opposite direction.

6. A closure for vessels comprising a top having a concave recess in the edge of one end thereof and provided with parallel depending securing clamps on the sides thereof, a stop at the end of one of the said clamps to limit the sliding movement thereof except to detach the same from a receptacle, and means to prevent the excessive sliding movement of said clamp in an opposite direction consisting of a depending element sharpened near its extremity to act as a closure remover.

GUSTAVUS A. MADDOX.